United States Patent [19]
Maeda

[11] Patent Number: 5,794,436
[45] Date of Patent: Aug. 18, 1998

[54] HYDRAULIC POWER TRANSMISSION

[75] Inventor: Koji Maeda, Anjo, Japan

[73] Assignee: Aisin AW Co., Ltd., Japan

[21] Appl. No.: 660,662

[22] Filed: Jun. 5, 1996

[30] Foreign Application Priority Data

Jun. 5, 1995 [JP] Japan ................... 7-138055

[51] Int. Cl.$^6$ ..................... F16D 33/00
[52] U.S. Cl. ..................... 60/367; 60/330
[58] Field of Search ............. 60/330, 362, 364, 60/365, 366, 367

[56] References Cited

U.S. PATENT DOCUMENTS

| | | | |
|---|---|---|---|
| 3,240,153 | 3/1966 | Schrader | 60/367 |
| 3,327,478 | 6/1967 | Alexandrescu | 60/366 |
| 5,522,220 | 6/1996 | Locker | 60/365 |

FOREIGN PATENT DOCUMENTS

| | | |
|---|---|---|
| 2278052 | 11/1990 | Japan. |
| 4131552 | 5/1992 | Japan. |
| 5272613 | 10/1993 | Japan. |

*Primary Examiner*—F. Daniel Lopez
*Attorney, Agent, or Firm*—Lorusso & Loud

[57] ABSTRACT

A hydraulic power transmission, such as a torque converter, has a pump impeller and a turbine runner with inclined blades having edge portions bent to form right angle connections to shells and cores of the pump impeller and the turbine runner. The inclination of the blades relative to the shells and cores provide improved transmission performance while the bent connecting edges forming right angles with the shells and cores eliminate gaps and secondary flows from acute angles between between the blades and the shells and cores to reduce oil leakage and the occurrence of secondary flows caused by such gaps. These blades have ample strength without central strengthening ribs to eliminate secondary flows caused by such ribs.

8 Claims, 4 Drawing Sheets

HYDRAULIC POWER TRANSMISSION

BACKGROUND OF THE INVENTION

This invention relates to a hydraulic power transmission such as a fluid torque converter or a fluid coupling, and particularly to a structure of blades connected to a shell and a core.

Generally a hydraulic power transmission, for example a fluid torque converter 1 as shown in FIG. 2, has a pump impeller 2, a turbine runner 3 and a stator 5, which together form a torus 6. The pump impeller 2 has an outer shell of the torus 6 formed by a portion of a case 7 and has multiple blades 10 fixed between the case 7 and a core 9 forming an inner shell of the torus 6. In the turbine runner 3, a shell 11 and a core 12 of the torus 6 are formed from press-worked steel sheet and multiple blades 13 are fixed between the shell 11 and the core 12. The stator 5 includes a hub part 15, a outer ring 16 and multiple blades 17 fixed between the hub part 15 and the ring 16. A drive plate connected to an engine crankshaft (not shown in the drawing) is fixed by bolts to a front cover 7a fixed integrally with the case 7, and a lockup clutch 19 is disposed inside the front cover 7a. The lockup clutch 19 is made up of a clutch plate 19a which moves in and out of contact with an inner side surface of the front cover 7a and a damper member 19b which absorbs shock accompanying joining of the clutch plate 19a with the front cover 7a. The lockup clutch 19 is fixed to a turbine hub 20 integrally with the part constituting the shell 11 of the turbine runner 3, and the turbine hub 20 is connected by a spline to an input shaft (not shown) of an automatic transmission made up of planetary gears. A one-way clutch 21 is disposed in the hub part 15 of the stator 5 and has an outer race 21a connected to the hub part 15 and an inner race 21b connected to a fixed sleeve of a housing (not shown).

The blades 10 and 13 of the pump impeller 2 and the turbine runner 3 each have a predetermined number (for example three) of tabs 10a, 13a formed on their outer sides and a predetermined number (for example 2) of claws 10b and 13b formed on their inner sides. The blades 10 and 13 are fixed between the shells 7 and 11 and the cores 9 and 12 by the tabs 10a and 13a being fitted into slots formed in the shells 7 and 11 and the claws 10b and 13b being fitted through slots in the cores 9 and 12 and then bent. Also, ribs 13c extending in the direction of the torus 6 are formed in the central portions of the blades 13 on the turbine runner 3 to strengthen these blades 13.

Fluid torque converters wherein the blades 10 and 13 are disposed inclined at a predetermined angle between the cores 9 and 12 and the shells 7 and 11 have been proposed. For example as disclosed in Japanese Unexamined Patent Publication No. H.2-278052 there have been proposed fluid torque converters wherein the cross section of the blades at a cylindrical plane m (n) extending horizontally to the shell side R (T) from a point P (Q) on the core side farthest from a center plane dividing the pump impeller 2 and the turbine runner 3 in the axial direction is inclined so that the core side P (Q) is further forward in the rotation direction than the shell side R (T) at an angle such that a capacity coefficient in a high speed ratio region becomes a maximum, whereby it is possible to increase the capacity coefficient without making the dimensions large and without reducing the torque ratio or efficiency.

As a result, the pump impeller 2 driven by rotation of an engine causes oil inside the torus 6 to circulate, the turbine runner 3 is caused to rotate by this flow of oil and this rotation is transmitted to the input shaft of the automatic transmission. When the speed difference between the pump impeller 2 and the turbine runner 3 is large the stator 5 changes the oil flow and amplifies the torque and when the speed difference is small the stator 5 idles on the one-way clutch 21 and functions as a hydraulic coupling. As a result of the blades 10 of the pump impeller 2 being inclined as described above, oil enters the pump impeller 2 at an inlet side end thereof, flows along the shell 7 sides of the blades and is discharged through an outlet side end.

FIG. 3 is a sectional view on the line n on the turbine runner 3 side in FIG. 2. As shown in FIG. 3, the blades 13 are mounted inclined at a predetermined angle θ with respect to a line l perpendicular to the shell 11 and the core 9. Therefore, oil entering the turbine runner 3 flows from the inlet side thereof to the outlet side thereof and also flows along the inclined blades 13 in the direction of the arrow C. Parts T and Q, where the blades 13 make contact with the shell 11 and the core 12, are at acute angles so that secondary oil flows easily arise in the flow along the blades 13 and secondary oil flows also easily occur at the ribs 13c in the centers of the blades.

As shown in FIG. 4 there are gaps D between the edges of the blades 13 next to the shell 11 where the tabs 13a are absent and secondary flows caused by these gaps D tend to occur. Furthermore oil sometimes leaks through between the tabs 13a and the slots formed in the shell 11 and through the gaps D. Although this description has been made with reference to the joints between the blades 13 and the shell 11, the same problems also occur at the joints between the blades 13 and the core 12; that is, secondary flows tend to arise due to gaps, and leakage of oil through the slots in the core 12 around the claws 13b readily occurs. Also the same problems of secondary oil flows and oil leakage occur in the pump impeller 2 in the same manner as described above in connection with the turbine runner 3, except that the blades 10 have no ribs to cause secondary oil flows and that the flow along the blades is opposite.

Therefore, the fluid torque converter described above has problems of the smooth flow of oil inside the torus being hindered which reduces efficiency.

Fluid torque converters, as shown in FIG. 5, wherein copper or the like is flowed into the above-mentioned gaps D by brazing and the gaps are thereby filled with copper 22 or the like to prevent secondary flows and oil leakage caused by these gaps have been proposed. However, brazing the joints of numerous blades one by one necessitates extremely troublesome and difficult work and results in greatly increased cost.

SUMMARY OF THE INVENTION

In this connection, an object of the present invention is to increase the performance of a hydraulic power transmission by reducing the occurrence of secondary flows therein without greatly increasing its manufacturing cost.

The invention is summarized in a hydraulic power transmission for transmitting power by circulating a fluid between a pump impeller and a turbine runner having shells and cores with multiple blades connected between these shells and cores. The blades of at least either the pump impeller or the turbine runner each have connecting parts connected to the shell and the core and a middle part between these connecting parts. The middle part of each blade is inclined at a predetermined angle with respect to a line perpendicular to the shell and the core. At least one of the connecting parts of each blade extends substantially perpendicular to the shell or core to which it is connected.

Preferably, the middle parts of the blades have smooth surfaces.

Also, preferably both the connecting parts connecting with the shell and the core extend substantially perpendicular to the shell and the core.

Also, preferably the blades of both the pump impeller and the turbine runner have the above-mentioned inclined middle parts and the above-mentioned connecting parts extending perpendicular to the shell and the core.

With the construction described above, fluid flowing along the blades flows along an incline over the middle parts but flows substantially perpendicular with respect to the shell and the core over the connecting parts, and as a result it is possible to reduce the occurrence of secondary flows compared to when the blades meet the shell and the core at acute angles.

Because the connecting parts and are substantially perpendicular to the shell and the core where the blades are joined to the shell and the core, there are no gaps and the occurrence of secondary flows and fluid leakage caused by such gaps is eliminated.

Furthermore, the connecting parts of the blades are bent from the middle parts to obtain ample strength of the blades without forming the ribs thereon that have conventionally been necessary. The fluid is guided smoothly over the blades to eliminate the occurrence of secondary flows caused by such ribs.

As described above according to a first aspect of the invention, the middle parts of the blades are inclined at a predetermined angle to increase efficiency by making the flow of fluid uniform as in conventional hydraulic power transmissions. The connecting parts of the blades joined to the shell and the core are substantially perpendicular to the shell and the core to reduce secondary flows and to eliminate gaps between the blades and the shell and the core compared to prior art connecting parts which are at acute angles to the shell and the core. In addition to reducing the occurrence of secondary flows and fluid leakage caused by acute angles and such gaps, the performance of the hydraulic power transmission is further increased.

Because all that is necessary is that the connecting parts of the blades be bent through a small angle so as to extend substantially perpendicular to the shell and the core, the blades can be manufactured easily and in large quantities by pressing. Attachment of the blades to the shell and the core is carried out easily and there is no increase in manufacturing cost.

According to a second aspect of the invention, the connecting parts of the blades are bent at an acute angle from the middle parts of the blades to extend substantially perpendicular to the shell or the core. This strengthens the blades and make special strengthening ribs unnecessary. As a result the blades can have smooth surfaces and fluid can be guided along the blades smoothly without secondary flows caused by ribs.

According to a third aspect of the invention, both the connecting parts connecting the blades to the shell and those connecting the blades to the core are manufactured to be substantially perpendicular to the shell and the core by pressing. Assembly is made easier because of the perpendicular connecting portions. Secondary flows caused by acute angles and secondary flows and fluid leakage caused by gaps are reduced without any increase in cost.

According to a fourth aspect of the invention, the effects described above are obtained in both the turbine runner and the pump impeller and the performance of the hydraulic power transmission can be increased even further.

DETAILED DESCRIPTION OF THE PREFERRED EMBODIMENTS

Figure 1A:
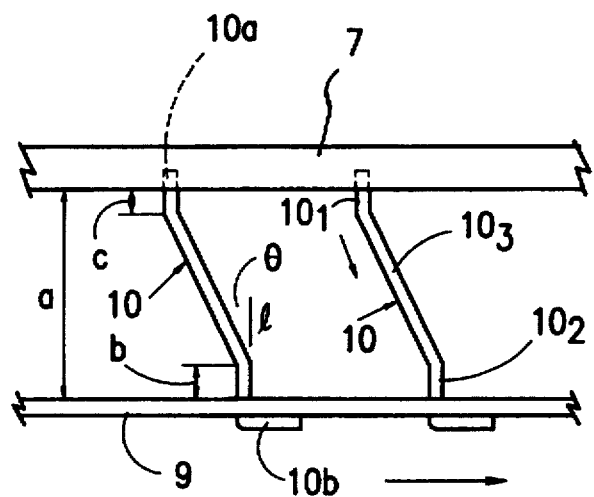
FIG. 1A is a sectional view of blades of a pump impeller according to a preferred embodiment of the invention.
Figure 1B:
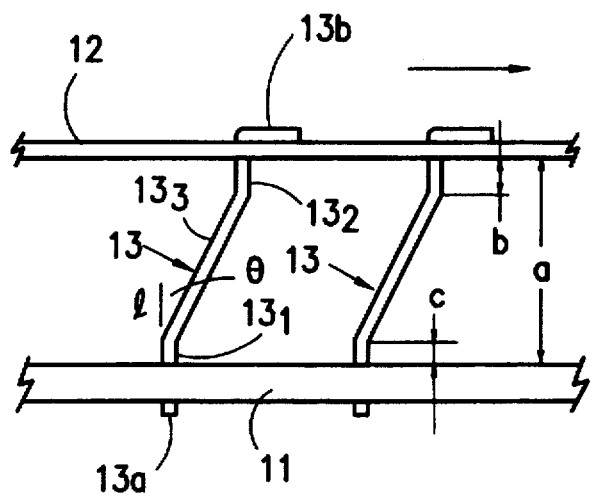
FIG. 1B is a sectional view of blades of a turbine runner according to a preferred embodiment of the invention.
Figure 2:
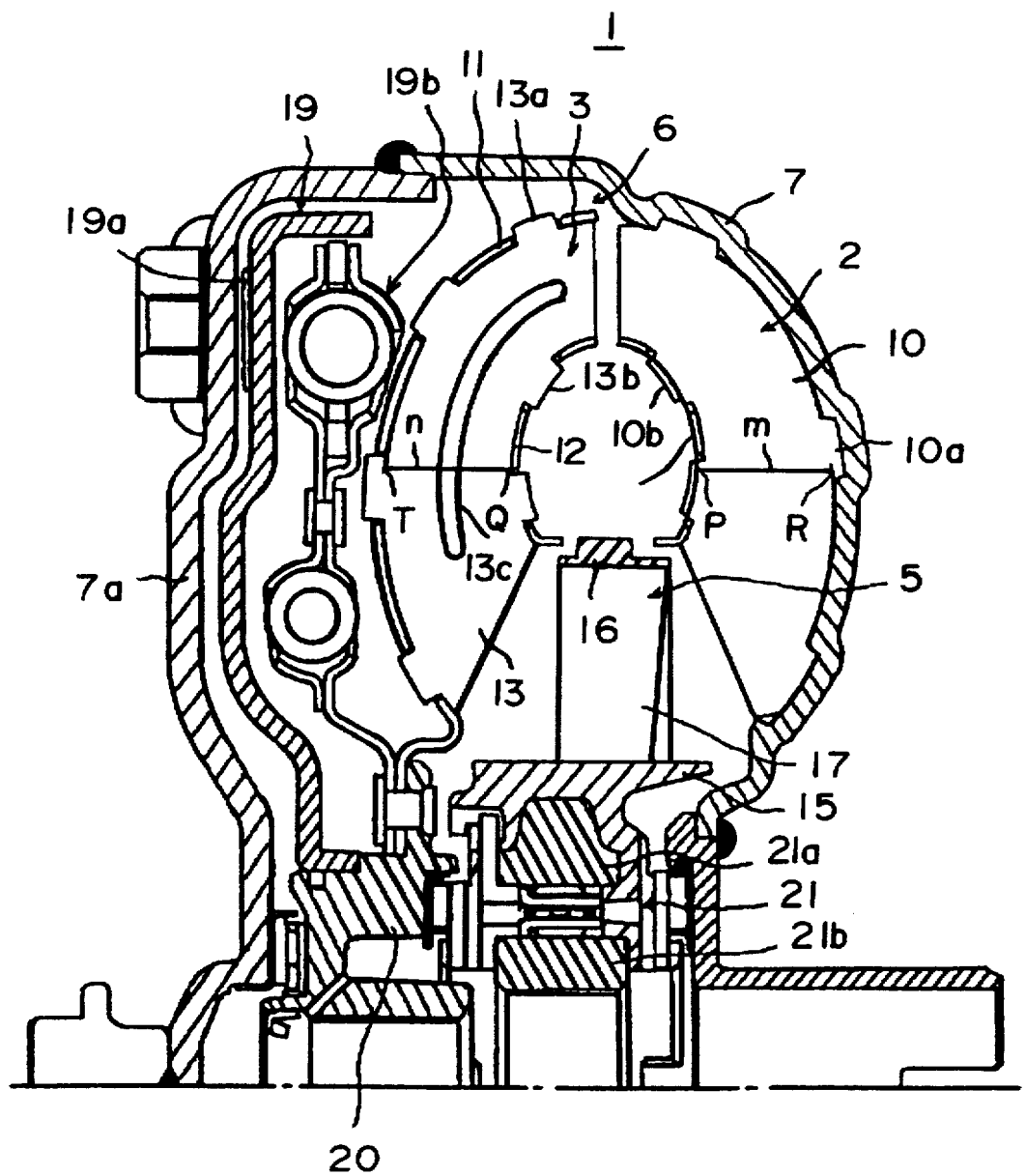
FIG. 2 is a sectional view of a fluid torque converter to which the invention can be applied.

The fluid torque converter 1 shown in FIG. 2 includes pump impeller blades 10 and turbine runner blades 13 which have structures as shown in FIGS. 1A and 1B. Except for the blades 10 and 13, the torque converter 1 has a structure and operation similar to the conventional technology described above and therefore will not be described again here.

As shown in FIG. 1A, pump impeller blades 10 are provided between the shell 7 and the core 9, and each blade 10 has a plurality of tabs $10a$ provided on its shell side and a plurality of claws $10b$ provided on its core side. The tabs $10a$ fit into slots formed in the shell 7 and the claws $10b$ fit through slots formed in the core 9 and are bent to thereby attach the blades 10 to the shell 7 and the core 9.

Figure 3:
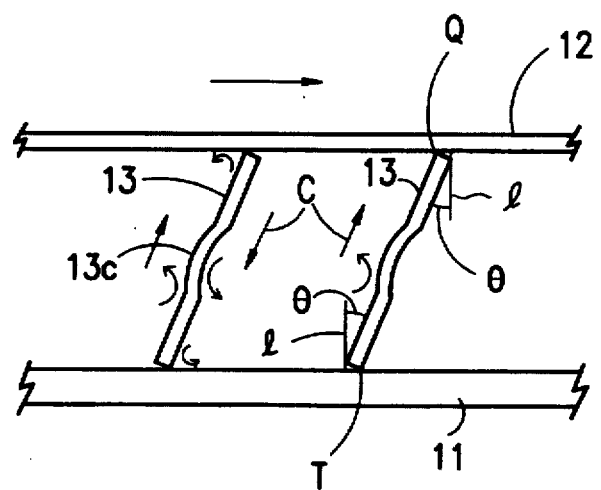
FIG. 3 is a sectional view of conventional blades.
Figure 4:
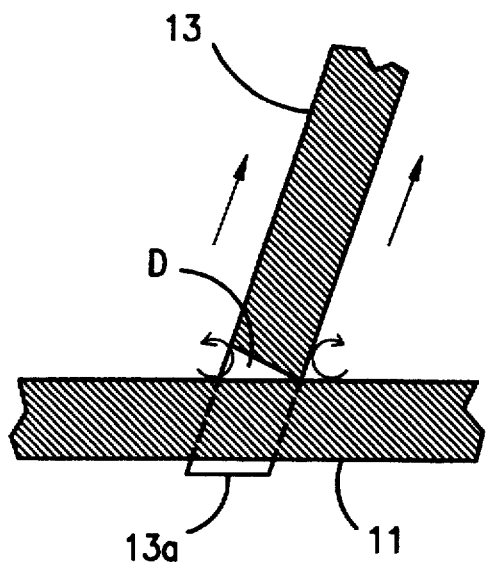
FIG. 4 is an enlarged view of a joint part of a conventional blade shown in FIG. 3.
Figure 5:
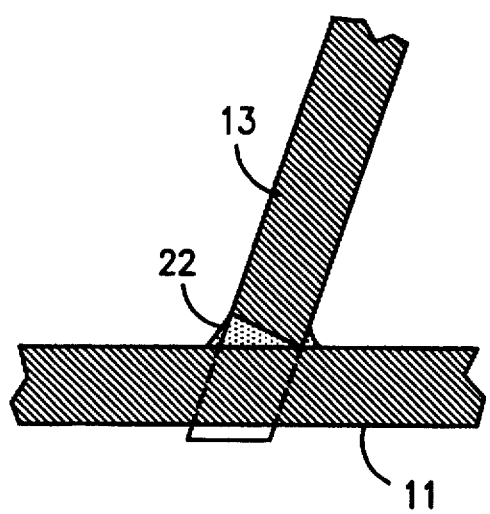
FIG. 5 is an enlarged sectional view of a joint part of a conventional blade which has been brazed.

Each of the blades 10 has a middle part $10_3$ inclined with respect to a line perpendicular to the mutually parallel shell 7 and core 9 at substantially the same angle of inclination θ as the blades shown in FIG. 3. A connecting part $10_1$ is connected to the shell 7 and a connecting part $10_2$ is connected to the core 9, each connecting part extending substantially perpendicular to the shell and the core. These connecting parts $10_1$ and $10_2$ have respective widths c and b which are preferably each ⅕ to ⅒ and more preferably about ⅛ of the width a between the shell 7 and the core 9.

These blades 10 are formed by press working sheet steel, and after sheet steel is stamped in a predetermined shape including the tabs $10a$ and the claws $10b$ the connecting parts $10_1$ and $10_2$ are bent through the predetermined angle θ. Multiple blades 10 are assembled to the shell 7 and the core 9 by the claws $10b$ being passed through the slots in the core 9, the tabs $10a$ being fitted into the slots in the shell 7 and the claws $10b$ then being bent.

As a result, oil enters the inlet part of the pump impeller 2 and flows along the blades 10 toward the outlet part thereof. When this happens, the blades 10 maintain a similar function to those shown in the conventional technology (FIG. 3) by means of the middle parts $10_3$. Because the connecting parts $10_1$ and $10_2$ are substantially perpendicular to the shell 7 and the core 9, the fluid flows smoothly over substantially perpendicular blade surfaces to prevent the occurrence of secondary flows caused by acute angles.

Also, because the connecting parts $10_1$, $10_2$ abut with the shell 7 and the core 9 from a direction substantially perpendicular thereto, no gaps are formed between the blade end surfaces and the shell and the core and the occurrence of secondary flows caused by gaps is prevented. Even when the blades 10 are joined to the shell 7 and the core 9 just by the tabs 10a and the claws 10b (i.e. when brazing is not carried out) the occurrence of oil leakage can be prevented.

As shown in FIG. 1B, turbine runner blades 13 are provided between the shell 11 and the core 12, and each blade 13 has a plurality of tabs 13a provided on its shell side and a plurality of claws 13b provided on its core side. The tabs 13a fit into slots formed in the shell 11 and the claws 13b fit through slots formed in the core 12 and are bent to thereby attach the blades 13 to the shell 11 and the core 12.

Each of the blades 13 has a middle part $13_3$ inclined with respect to a line perpendicular to the mutually parallel shell 11 and core 12 at substantially the same angle of inclination θ as the blades shown in FIG. 3. A connecting part $13_1$ of each blade 13 is connected to the shell 11 and a connecting part $13_2$ is connected to the core 12, each connecting part extending substantially perpendicular to the shell and the core. These connecting parts $13_1$ and $13_2$ have respective widths c and b which are preferably each ⅕ to ⅒ and more preferably about ⅛ of the width a between the shell 11 and the core 12 in length.

These blades 13 are formed by press working sheet steel, and after sheet steel is stamped in a predetermined shape including the tabs 13a and the claws 13b the connecting parts $13_1$ and $13_2$ are bent through the predetermined angle θ. Multiple blades 13 are assembled to the shell 11 and the core 12 by the claws 13b being passed through the slots in the core 12, the tabs 13a being fitted into the slots in the shell 11 and the claws 13b then being bent.

As a result, oil delivered from the pump impeller 2 enters the inlet part of the turbine runner 3 and flows along the blades 13 toward the outlet part thereof. When this happens, the blades 13 maintain a similar function to those shown in the conventional technology (FIG. 3) by means of the middle parts $13_3$. Because the connecting parts $13_1$ and $13_2$ are substantially perpendicular to the shell 11 and the core 12, the fluid flows smoothly over substantially perpendicular blade surfaces at these connecting parts to prevent the occurrence of secondary flows caused by acute angles.

Also, because the connecting parts $13_1$, $13_2$ abut with the shell 11 and the core 12 from a direction substantially perpendicular thereto, no gaps are formed between the blade edge surfaces and the shell and the core. Oil leakage and the occurrence of secondary flows caused by gaps is prevented even when the blades 13 are joined to the shell 11 and the core 12 just by the tabs 13a and the claws 13b (i.e. when brazing is not carried out).

Also, the connecting parts $13_1$, $13_2$ connecting with the shell 11 and the core 12 are bent with respect to the middle part $13_3$ so that the blades 13 are consequently strengthened. Ribs on the turbine runner blades which have conventionally been necessary are therefore not needed. As a result the occurrence of secondary flows caused by such ribs is eliminated.

As a result of the above described structure of the blades 10 and 13, oil flows smoothly along the blades 10 and 13, energy losses caused by secondary flows are reduced and the performance of the fluid torque converter is increased.

Many modifications, variations and changes in detail can be made to the above described embodiment without departing from the scope and spirit of the invention. For example, the above blade structure is not limited to fluid torque converters but can be similarly used in a fluid coupling having a pump impeller and a turbine runner.

What is claimed is:

1. A hydraulic power transmission for transmitting power comprising a pump impeller and a turbine runner for transmitting power by circulating a fluid between said pump impeller and a turbine runner; said pump impeller and a turbine runner each having a shell, a core and multiple sheet-like blades connected to said shell and said core; wherein:

said sheet-like blades in at least one of said pump impeller and a turbine runner each have a first connecting part connected to said shell and a second connecting part connected to said core and a middle part between these connecting parts, and said middle part has a first side connected to said first connecting part, a second side connected to said second connecting part, and is inclined at a predetermined angle to a line perpendicular to said shell and said core; and at least one of said first connecting part connected to said shell and said second connecting part connected to said core extends substantially perpendicular to said shell and said core.

2. A hydraulic power transmission according to claim 1 wherein: said middle part of said sheet-like blade has smooth surfaces.

3. A hydraulic power transmission according to claim 1 wherein: both of said connecting parts extend substantially perpendicular to said shell and said core.

4. A hydraulic power transmission according to claim 1 wherein: said sheet-like blades of both said pump impeller and said turbine runner have said inclined middle part and said connecting parts extending substantially perpendicular to said shell and said core.

5. A hydraulic power transmission according to claim 4 wherein said each of said sheet-like blades have a width a extending between said shell and said core, each second connecting part connected to said core has a width b, each first connecting part connected to said shell has a width c, and widths b and c are in the range from ⅕th to ⅒th of the width a.

6. A hydraulic power transmission according to claim 5 wherein each of said sheet-like blades are stamped steel sheets, and said connecting parts include tabs or claws connecting the stamped steel sheets to said shell and said core.

7. A hydraulic power transmission according to claim 1 wherein each of said sheet-like blades have a width a extending between said shell and said core, each second connecting part connected to said core has a width b, each first connecting part connected to said shell has a width c, and widths b and c are in the range from ⅕th to ⅒th of the width a.

8. A hydraulic power transmission according to claim 1 wherein each of said sheet-like blades are stamped steel sheets, and said connecting parts include tabs or claws connecting the stamped steel sheets to said shell and said core.

* * * * *